US009519564B1

(12) United States Patent
Merrill

(10) Patent No.: US 9,519,564 B1
(45) Date of Patent: Dec. 13, 2016

(54) TRACE SAVING INTERVALS

(71) Applicant: EMC Corporation, Hopkinton, MA (US)

(72) Inventor: Marshall L. Merrill, Durham, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 361 days.

(21) Appl. No.: 13/631,690

(22) Filed: Sep. 28, 2012

(51) Int. Cl.
G06F 11/00 (2006.01)
G06F 11/34 (2006.01)

(52) U.S. Cl.
CPC .................. *G06F 11/3466* (2013.01)

(58) Field of Classification Search
CPC .............. G06F 11/3466; G06F 11/3476; G06F 11/3636
USPC .................................................... 714/38.1, 45
See application file for complete search history.

(56) References Cited

U.S. PATENT DOCUMENTS

| | | | |
|---|---|---|---|
| 5,111,384 A | 5/1992 | Aslanian et al. | |
| 5,999,933 A | 12/1999 | Mehta | |
| 6,226,761 B1 | 5/2001 | Berstis | |
| 6,681,348 B1 | 1/2004 | Vachon | |
| 7,017,084 B2 * | 3/2006 | Ng et al. ........................ | 714/45 |
| 7,028,056 B1 | 4/2006 | Hendel et al. | |
| 7,039,834 B1 * | 5/2006 | Orfali ................. | G06F 11/2236 714/39 |
| 7,191,364 B2 | 3/2007 | Hudson | |
| 7,454,665 B2 * | 11/2008 | Menadue ............ | G06F 11/0775 711/173 |
| 7,493,598 B1 * | 2/2009 | Craggs ................ | G06F 11/3636 714/38.1 |
| 7,496,794 B1 | 2/2009 | Eastham et al. | |
| 7,653,848 B2 * | 1/2010 | Abernathy et al. . | G06F 11/3672 712/227 |
| 7,757,129 B2 | 7/2010 | Bohizic et al. | |
| 7,783,932 B1 | 8/2010 | Eigen et al. | |
| 7,788,537 B1 | 8/2010 | Yellen et al. | |
| 7,870,437 B2 | 1/2011 | Swaine et al. | |
| 8,141,051 B2 * | 3/2012 | Huang et al. ................. | 717/127 |
| 8,176,366 B2 | 5/2012 | Horley et al. | |
| 8,510,721 B2 * | 8/2013 | Dadiomov et al. ........... | 717/128 |
| 8,713,375 B2 * | 4/2014 | Gilkerson et al. ............. | 714/45 |

(Continued)

OTHER PUBLICATIONS

Python: module pexpect (Version 2.3), [online] [retrieved on Sep. 20, 2012]. Retrieved from the Internet URL: http://pexpect:sourceforge.net/pexpect.html., 13 pages.

(Continued)

*Primary Examiner* — Marc Duncan
(74) *Attorney, Agent, or Firm* — Hamilton, Brook, Smith & Reynolds, P.C.

(57) ABSTRACT

In one embodiment, a method comprises defining a temporal interval. The method further comprises saving a set of selected traces to a memory. The set of selected traces may be generated during the defined temporal interval. A starting point of the temporal interval may be defined upon a generated trace and an ending point of the temporal interval may be a length of time after the starting point. The set of selected traces may include at least one of a first trace, a highest priority trace, and a last trace. The set of selected traces may include a set of first traces, a set of high priority traces, and a set of last traces. The set of selected traces may include a set of traces over a priority threshold.

19 Claims, 6 Drawing Sheets

(56) References Cited

U.S. PATENT DOCUMENTS

| | | | |
|---|---|---|---|
| 9,176,803 B2* | 11/2015 | Biberdorf et al. | G06F 11/0709 |
| 2004/0250170 A1 | 12/2004 | Glerum et al. | |
| 2005/0060372 A1* | 3/2005 | DeBettencourt et al. | H04L 43/028 709/206 |
| 2005/0120162 A1 | 6/2005 | Sivaram | |
| 2007/0011492 A1* | 1/2007 | Swaine | 714/35 |
| 2008/0126828 A1 | 5/2008 | Girouard et al. | |
| 2008/0141226 A1* | 6/2008 | Girouard | G06F 11/3664 717/128 |
| 2009/0019310 A1 | 1/2009 | Nastacio | |
| 2009/0044051 A1 | 2/2009 | Nellitheertha | |
| 2009/0049342 A1* | 2/2009 | Dickenson et al. | 714/45 |
| 2009/0222796 A1 | 9/2009 | Keohane et al. | |
| 2011/0029823 A1* | 2/2011 | Horley et al. | G06F 11/3476 714/45 |
| 2011/0202801 A1* | 8/2011 | Horley et al. | G06F 11/348 714/45 |
| 2012/0017123 A1* | 1/2012 | Masser et al. | 714/45 |
| 2012/0166893 A1 | 6/2012 | Chen | |
| 2012/0204068 A1 | 8/2012 | Ye | |
| 2012/0297254 A1* | 11/2012 | Shazly | G06F 11/3476 714/45 |
| 2013/0055032 A1* | 2/2013 | Cole et al. | 714/45 |
| 2015/0317231 A1* | 11/2015 | Hsieh et al. | G06F 11/3476 707/609 |

OTHER PUBLICATIONS

Expect, NIST Engineering Laboratory, [online], Last updated Apr. 2010, [retrieved on Sep. 19, 2012]. Retrieved from the Internet URL: http://www.nist.gov/el/msid/expect.cfm, 2 pages.

Toupin, D., "Advanced C/C++ Debugging (CDT Project) Tracing (Linux Tools Project)," *Ericsson Eclipse Summit*, Ludwigsburg, Germany (2010).

Sidewell, N., et al., "Non-Stop Multi-Threaded Debugging in GDB," *GCC Developers' Summit*, pp. 117-127 (2008).

Toupin, D., "Linus Toolchain Overview, Debugging (GDB), Tracing (LTTNG) Features Tool Work Group," *Ericsson, Embedded Linux Conference*, (2010).

"Debugging," *Gem5.org*, pp. 1-10 (2012).

\* cited by examiner

TRACE SAVING INTERVALS

BACKGROUND

In certain systems, an application can generate error messages, or traces. Traces can help a user determine the cause of the error of the application and possibly fix the error. Certain errors in the application, however, can generate a cascade of traces.

BRIEF DESCRIPTION OF THE DRAWINGS

In the accompanying drawings like reference characters refer to the same parts throughout the different views. The drawings are not necessarily to scale, emphasis instead being placed upon illustrating embodiments.

DETAILED DESCRIPTION

A description of example embodiments follows.

In one embodiment, a method comprises defining a temporal interval. The method further comprises saving a set of selected traces to a memory. The set of selected traces may be generated during the defined temporal interval.

A starting point of the temporal interval may be defined upon a generated trace and an ending point of the temporal interval may be a length of time after the starting point. The set of selected traces may include at least one of a first trace, a highest priority trace, and a last trace. The set of selected traces may include a set of first traces, a set of high priority traces, and a set of last traces. The set of selected traces may include a set of traces over a priority threshold.

The method may further include allowing a cascade of traces to be unsaved. The cascade of traces may be outside of the set of selected traces. The method may further include classifying at least one trace priority to be selected in the set of selected traces.

An apparatus may include an interval definition module configured to define a temporal interval. The apparatus may further include a trace saving module configured to save a set of selected traces to a memory. The set of selected traces may be generated during the defined temporal interval.

Figure 1:
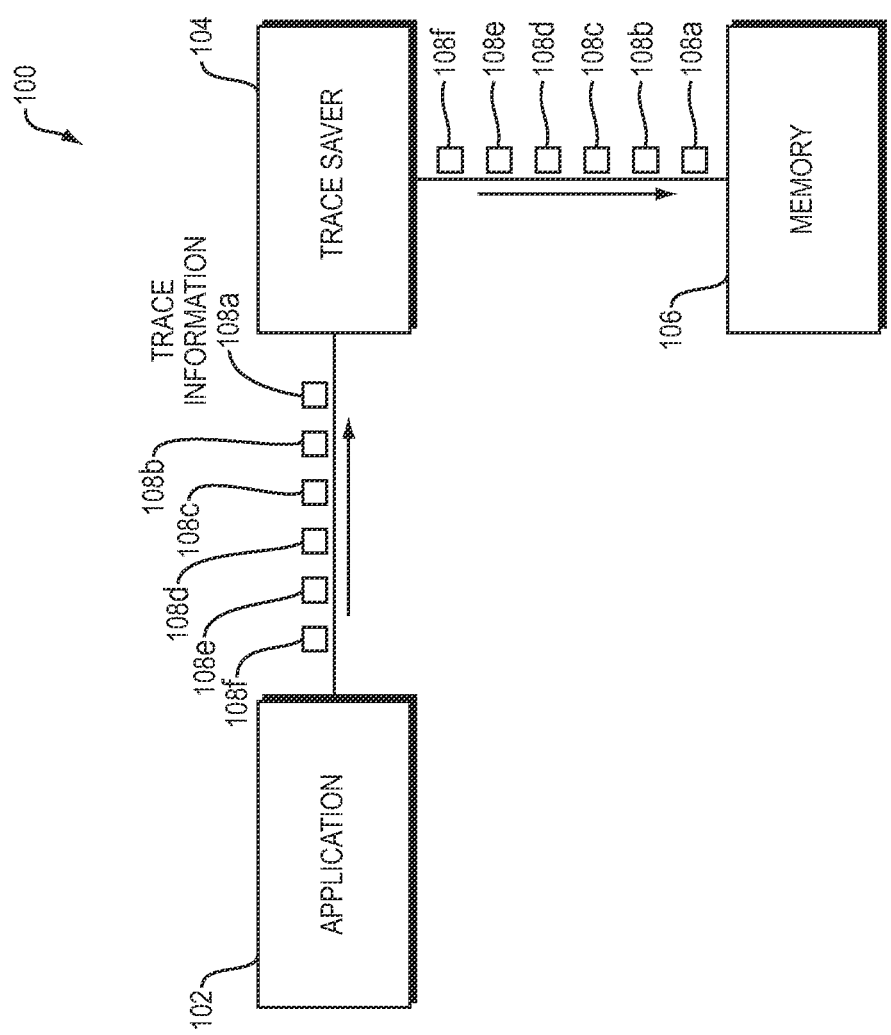
FIG. 1 is a block diagram illustrating an example embodiment of a trace saver.

FIG. 1 is a block diagram 100 illustrating an example embodiment of a trace saver 104. A trace saver 104 is operatively coupled to an application 102. The trace saver 104 is configured to receive a plurality of trace information 108a-f from the application 102. Trace information 108a-f can be any number of traces, even though FIG. 1 illustratively depicts six traces sent from the application to the trace saver 104.

The trace saver 104, in this embodiment, is configured to save all traces to a memory 106. The trace saver 104 therefore forwards the trace information 108a-f to the memory 106 for storage.

However, the memory 106 may be limited in size and may not be able to store all of the trace information 108a-f. Further, many times, the application 102 generates a large or excessive amount of trace information 108 that can be repetitive or redundant. When this occurs, not every single instance of trace information 108 needs to be saved in the memory 106 for later analysis. Saving each and every trace information 108 not only increases the difficulty of analyzing the trace information later, but can limit the free space in the memory 106 by storing repetitive traces 108 in the memory 106.

Figure 2A:
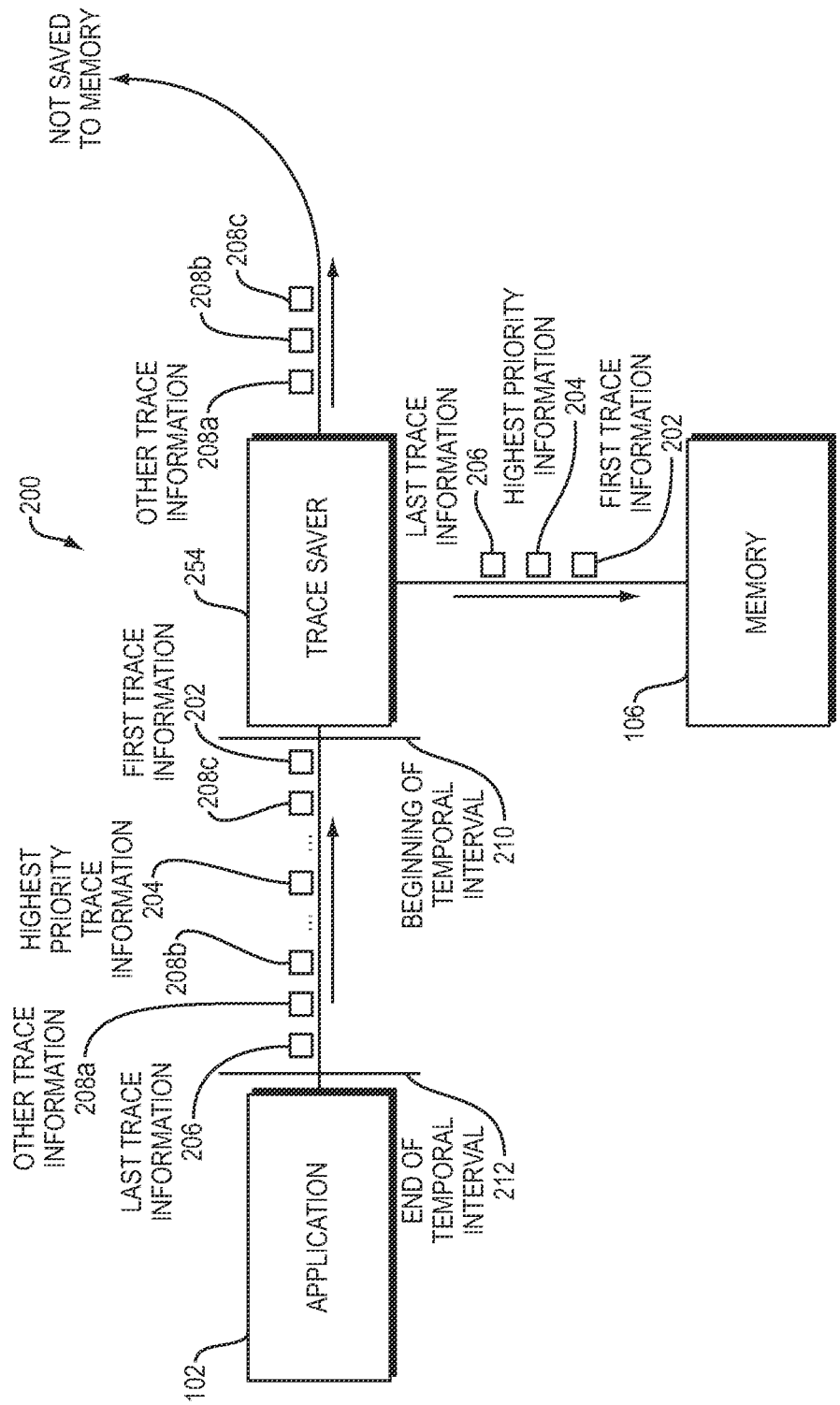
FIG. 2A is a block diagram illustrating another embodiment of a trace saver.

FIG. 2A is a block diagram 200 illustrating another embodiment of a trace saver 254. The trace saver 254 is coupled to the application 102 and the memory 106. However the trace saver 254 is configured to define a temporal interval upon receiving a first trace information 202. The trace saver 254 defines the temporal interval by setting a beginning of the temporal interval 210 and an end of the temporal interval 212. In one embodiment, the beginning of the temporal interval 210 is the time that the first trace information 202 is received. The end of the temporal interval 212 can be a time delayed/offset from the beginning of the temporal interval 210. For example, the temporal interval can be set to be a constant amount of seconds, such as four seconds. The end of the temporal interval 212 is then four seconds after the beginning of the temporal interval 210.

During the temporal interval, the trace saver 254 is configured to save the first trace information 202, a last trace information 206, and a highest priority trace information 204. Each trace includes a priority, for example, in the form of an integer, so the trace saver 254 can compare each received trace to a saved highest priority trace information as the traces arrive, and always have the highest priority trace information 204 saved. In another embodiment, the trace saver 254 can save a plurality of highest priority trace information 204. In another embodiment, the trace saver 254 can save trace information above a certain priority threshold, where the priority threshold is set either manually or dynamically. In yet another embodiment, the trace saver 254 can save a set of first trace information 202, and a set of last trace information 206, so that a plurality of traces at the beginning and the end of the temporal interval are saved. For example the trace saver 254 could save the first five traces, save the last five traces, and also save the five highest priority trace information 204. However, it should be understood that these numbers can be adjusted to configure the trace saver 254 differently.

The trace saver 254, therefore, selects certain trace information to be saved and certain trace information to be discarded. Other trace information 208a-c which is not first trace information 202, highest priority trace information 204, or last trace information 206, is therefore not saved to the memory 106. The trace saver 254 directs the first trace information 202, the highest priority trace information 204, and the last trace information 206 to the memory 106. The tracer saver 254 can also direct other traces to the memory 106 if the trace saver is configured differently as described above.

Figure 2B:
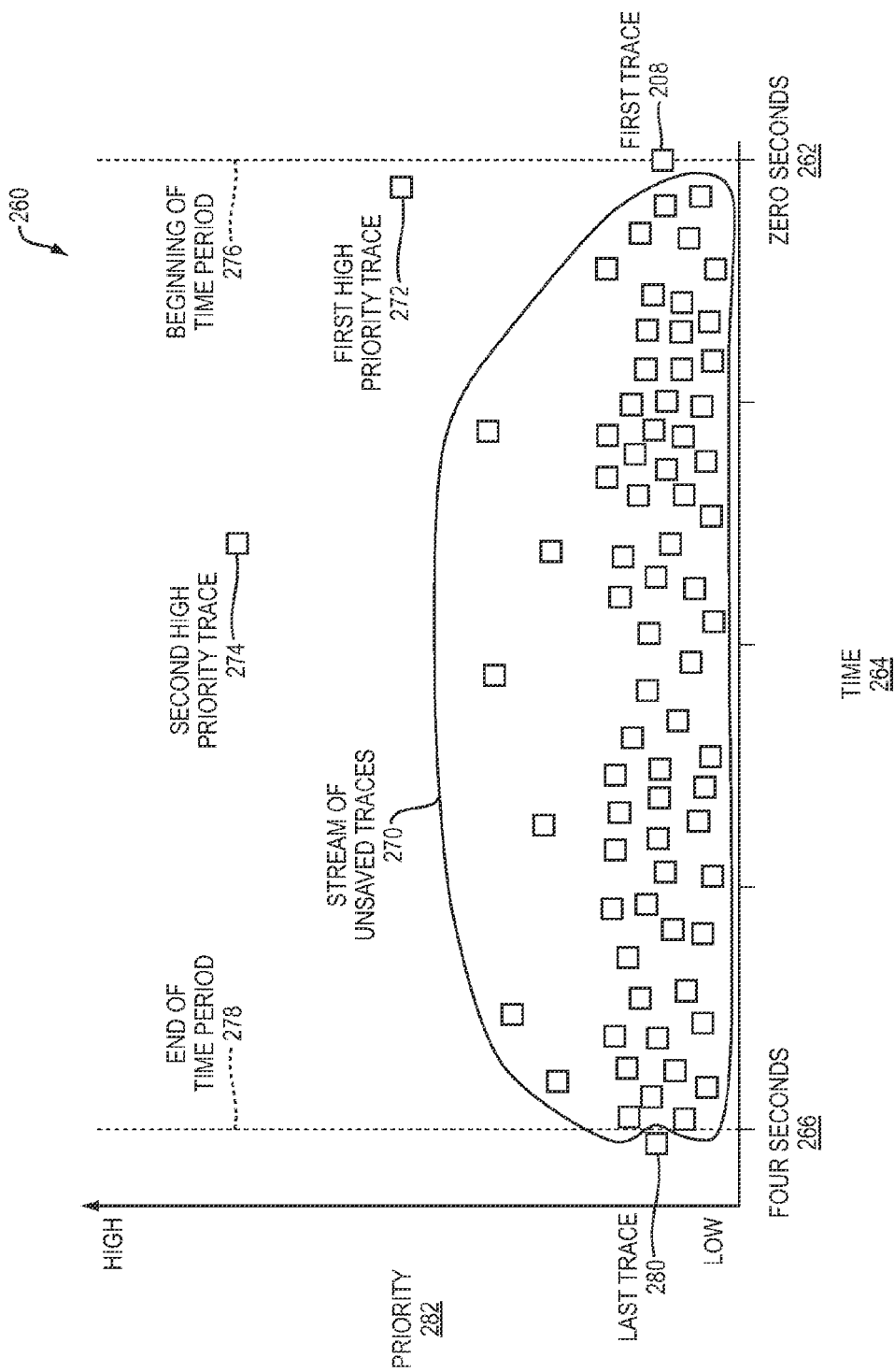
FIG. 2B is a time diagram illustrating an example embodiment of receiving a stream of traces at a trace saver.

FIG. 2B is a time diagram 260 illustrating an example embodiment of receiving a stream of traces at a trace saver. Time diagram 260 illustrates traces received over time 264, from a first trace 268 received at time zero seconds 262, to a last trace received 280 at time four seconds 266.

Upon receiving the first trace 268, the trace saver initiates a time interval bounded by a beginning of time period 276 and an end of time period 278. Within that time interval, the trace saver is configured to save a first trace 268, a last trace

280, and a highest priority trace. A stream of unsaved traces 270 are received but are not saved to conserve memory.

In this example, the trace saver determines the highest priority trace by measuring a priority 282 of each trace as they are received. The trace saver measures the priority of every trace except for the first trace 268 and the last trace 280, which are saved regardless of priority. In this example, the trace saver receives a first high priority trace 272 and saves it temporarily. Later, the trace saver receives a second high priority trace 274. As the second high priority trace 274 has a higher priority than the first high priority trace 272, the second high priority trace is saved temporarily, and the first high priority trace 272 is no longer saved. At the end of the time period 278, in this example, the trace saver has received no traces with a higher priority than second high priority trace 274, so it returns and/or saves the second high priority trace 274 as the highest priority trace received in the time interval. The trace saver also saves the last trace received within the time interval.

Figure 3:
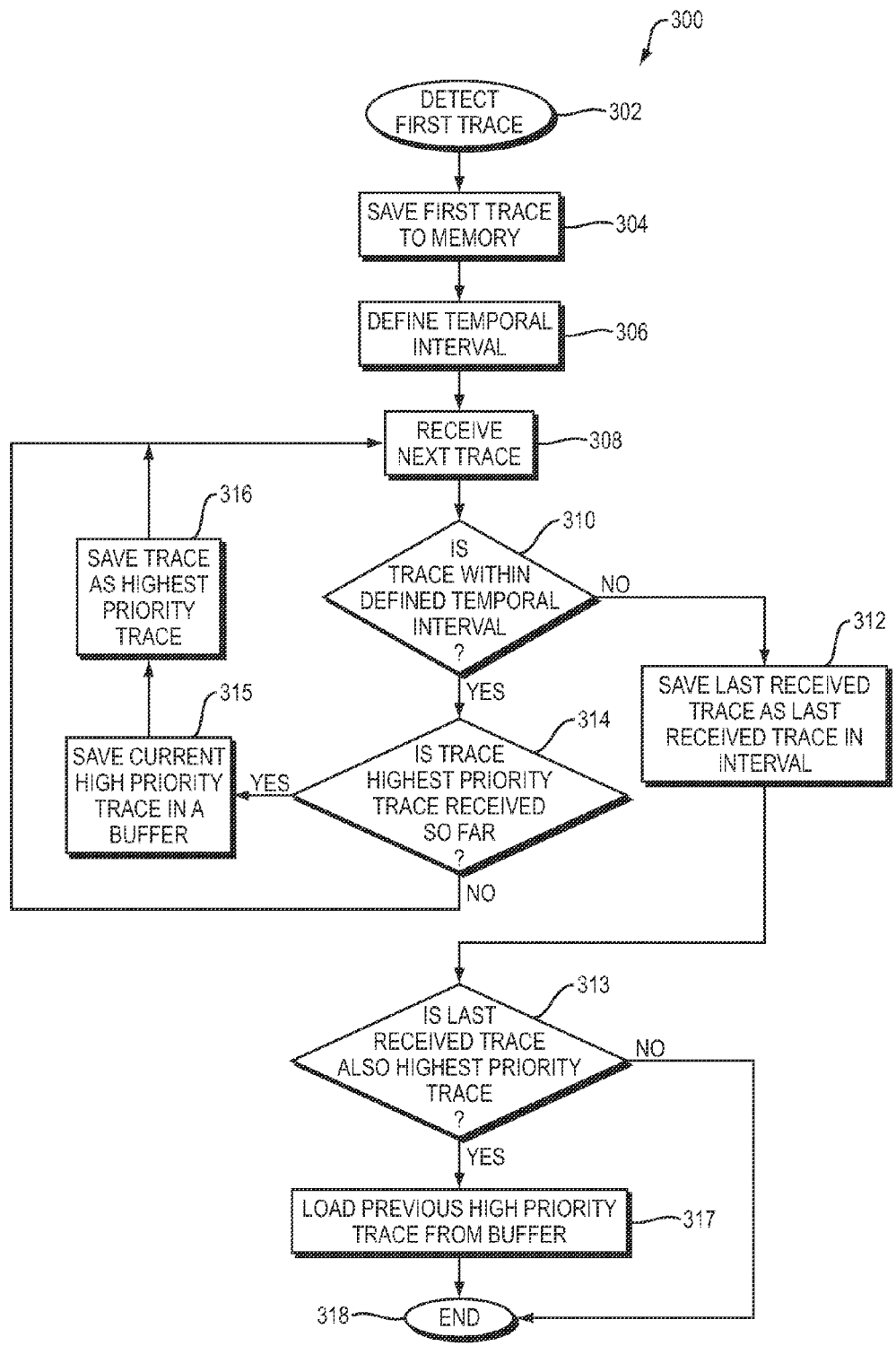
FIG. 3 is a flow diagram illustrating an example embodiment of a process employed by the trace saver shown in FIG. 2.

FIG. 3 is a flow diagram 300 illustrating example embodiment of a process employed by the trace saver 254. The trace saver first detects the first trace (302). The trace saver saves the first trace to the memory (304). Then, the trace saver defines the temporal interval (306). The trace saver receives the next trace (308). Then, the trace saver determines whether the trace saver is received within the defined temporal interval (310). If the trace is received within the defined temporal interval (310), the trace saver then determines whether the trace is a highest priority trace received so far (314). If the trace is the highest priority trace received so far, the trace saver first saves the current high priority trace in a buffer (315). Then, the trace saver saves the trace as the highest priority trace (e.g., by overwriting the previous trace, where the previous trace is now stored in the buffer) (316). If a highest priority trace has already been stored, the trace saver saves the previously stored trace as the second-highest priority trace seen, and overwrites the previously stored trace. Then the system continues by receiving the next trace (308) and proceeding as previously described. On the other hand, if the trace is not the highest priority trace received so far (314), the trace saver then receives the next trace (308) and proceeds as described previously.

Further, if the trace is not received within the defined temporal interval (310), the system then saves the last received trace when the defined interval ends (312). The trace saver then determines whether the last received trace is also the highest priority trace (313). If so, the trace saver loads the second highest priority trace from the buffer (317). Then, the trace saver ends the process (318). Alternatively, if the trace saver determines that the last received trace is not the highest priority trace (313), then the process also ends (318).

Figure 4:
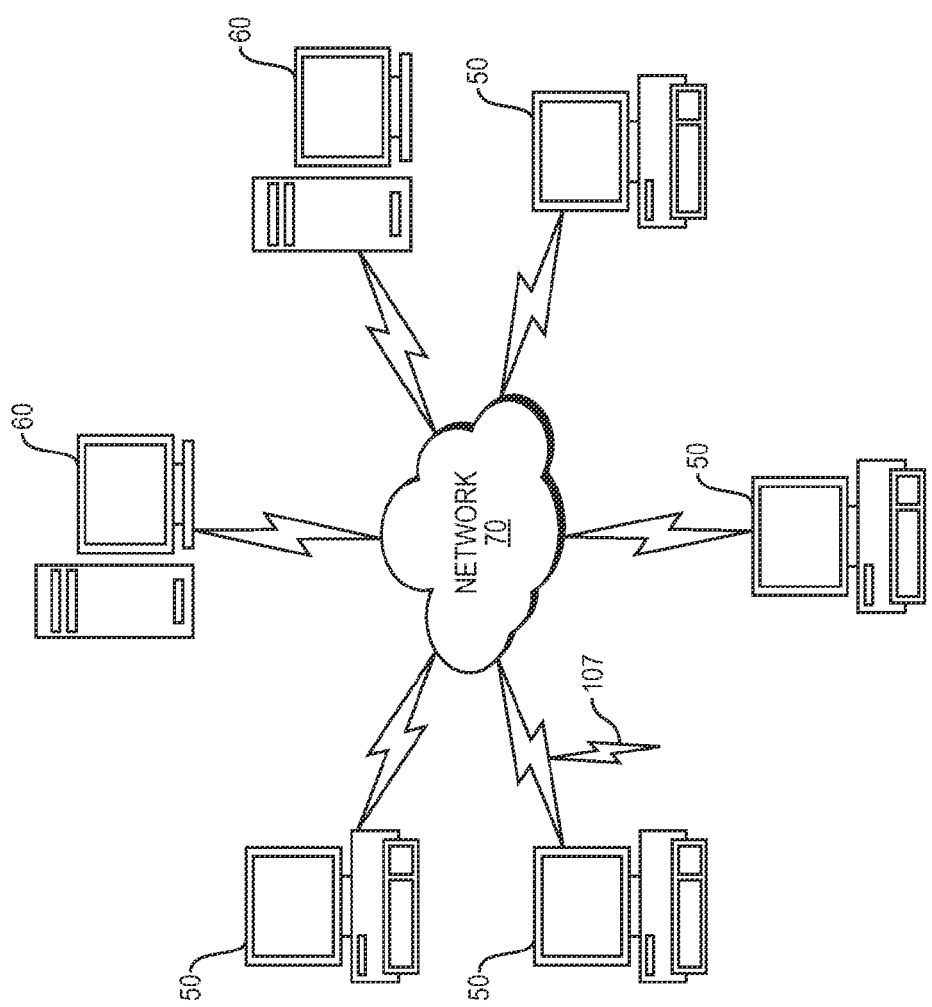
FIG. 4 illustrates a computer network or similar digital processing environment in which the present invention may be implemented.

FIG. 4 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
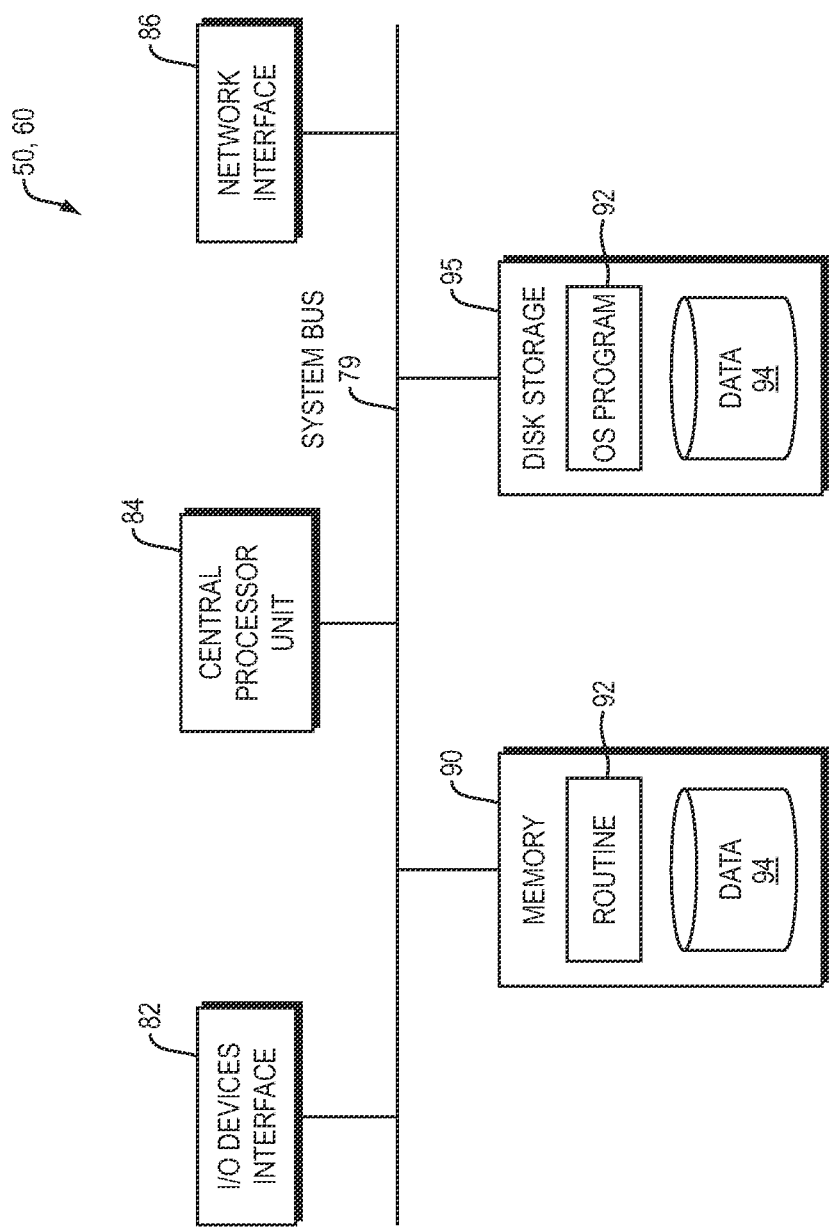
FIG. 5 is a diagram of the internal structure of a computer in the computer system of FIG. 4.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the present invention (e.g., trace saver code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While embodiments have been particularly shown and described with references to example embodiments thereof, it will be understood by those skilled in the art that various changes in form and details may be made therein without departing from the scope of the embodiments encompassed by the appended claims.

What is claimed is:

1. A method of managing an application error comprising:
by a processor:
defining, by an interval definition module, a temporal interval associated with an occurrence of one or more received traces characterizing behavior of an application related to an application error, each of the one or more received traces including a priority, the temporal interval initiated upon receipt of a first trace of the one or more received traces and continuing for a predetermined amount of time, the one or more received traces occurring without stimulation from the interval definition module;
when one or more subsequent traces occur within the temporal interval after the first trace, comparing the priorities of the subsequent traces to identify a set of traces with a priority above a certain priority threshold, the set of traces includes a first trace, a highest priority trace, and a last trace, wherein the highest priority trace is designated by (i) comparing the priority of each of the traces to the priority of other traces in the set of traces, and (ii) designating, as the highest priority trace, a single trace having priority that is greater than or equal to the priority of the other traces in the set of traces, wherein for two or more traces having equal priority, the first-received trace of the two or more traces having equal priority is designated as the highest priority trace; and
saving the identified set of traces to a common memory, and not saving the subsequent traces not identified as having a priority above a certain priority threshold, the saved set of traces being available to facilitate determining at least one of an error source and an error correction.

2. The method of claim 1, wherein a starting point of the temporal interval is defined upon a generated trace and an ending point of the temporal interval is a length of time after the starting point.

3. The method of claim 1, wherein the set of traces includes a set of first traces, a set of high priority traces, and a set of last traces.

4. The method of claim 1, wherein the set of traces includes a set of traces over a priority threshold.

5. The method of claim 1, further comprising allowing a cascade of traces to be unsaved, the cascade of traces being outside of the set of traces.

6. The method of claim 1, further comprising classifying at least one trace priority to be selected in the set of traces.

7. An apparatus comprising:
an interval definition module configured to define a temporal interval associated with an occurrence of one or more received traces characterizing behavior of an application related to an application error, each of the one or more received traces including a priority, the temporal interval initiated upon receipt of a first trace of the one or more received traces and continuing for a predetermined amount of time, the one or more received traces occurring without stimulation from the interval definition module;
a trace saving module configured to:
(i) when one or more subsequent traces occur within the temporal interval after the first trace, comparing the priorities of the subsequent traces to identify a set of traces with a priority above a certain priority threshold, the set of traces includes a first trace, a highest priority trace, and a last trace, wherein the highest priority trace is designated by (i) comparing the priority of each of the traces to the priority of other traces in the set of traces, and (ii) designating, as the highest priority trace, a single trace having priority that is greater than or equal to the priority of the other traces in the set of traces, wherein for two or more traces having equal priority, the first-received trace of the two or more traces having equal priority is designated as the highest priority trace; and
(iii) saving the identified set of traces to a common memory, and not saving the subsequent traces not identified as having a priority above a certain priority threshold, the saved set of races being available to facilitate determining at least one of an error source and an error correction.

8. The apparatus of claim 7, wherein a starting point of the temporal interval is defined upon a generated trace and an ending point of the temporal interval is a length of time after the starting point.

9. The apparatus of claim 7, wherein the set of traces includes a first trace, a highest priority trace, and a last trace.

10. The apparatus of claim 7, wherein the set of traces includes a set of first traces, a set of high priority traces, and a set of last traces.

11. The apparatus of claim 7, wherein the set of traces includes a set of traces over a priority threshold.

12. The apparatus of claim 7, wherein the trace saving module is further configured to allow a cascade of traces to be unsaved, the cascade of traces being outside of the set of traces.

13. The apparatus of claim 7, further comprising a classification module configured to classify at least one trace priority to be selected in the set of traces.

14. A non-transitory computer readable medium configured to store instructions which, when executed by a processor, cause performance of a method comprising:
defining, by an interval definition module, a temporal interval associated with an occurrence of one or more received traces characterizing behavior of an application related to an application error, each of the one or more received traces including a priority, the temporal interval initiated upon receipt of a first trace of the one or more received traces and continuing for a predetermined amount of time, the one or more received traces occurring without stimulation from the interval definition module;
when one or more subsequent traces occur within the temporal interval after the first trace, comparing the priorities of the subsequent traces to identify a set of traces with a priority above a certain priority threshold, the set of traces includes a first trace, a highest priority trace, and a last trace, wherein the highest priority trace is designated by (i) comparing the priority of each of the traces to the priority of other traces in the set of traces, and (ii) designating, as the highest priority trace, a single trace having priority that is greater than or equal to the priority of the other traces in the set of traces, wherein for two or more traces having equal priority, the first-received trace of the two or more traces having equal priority is designated as the highest priority trace; and
saving the identified set of traces to a common memory, and not saving the subsequent traces not identified as having a priority above a certain priority threshold, the saved set of races being available to facilitate determining at least one of an error source and an error correction.

15. The non-transitory computer readable medium of claim 14, wherein a starting point of the temporal interval is defined upon a generated trace and an ending point of the temporal interval is a length of time after the starting point.

16. The non-transitory computer readable medium of claim 14, wherein the set of traces includes a first trace, a highest priority trace, and a last trace.

17. The non-transitory computer readable medium of claim 14, wherein the set of traces includes a set of first traces, a set of high priority traces, and a set of last traces.

18. The non-transitory computer readable medium of claim 14, wherein the processor is further configured to execute the step of allowing a cascade of traces to be unsaved, the cascade of traces being outside of the set of traces.

19. The non-transitory computer readable medium of claim 14, wherein the processor is further configured to execute the step of classifying at least one trace priority to be selected in the set of traces.

\* \* \* \* \*